Jan. 13, 1959     T. C. HEATH     2,869,051
ELECTRIC REGULATOR
Filed Sept. 22, 1954
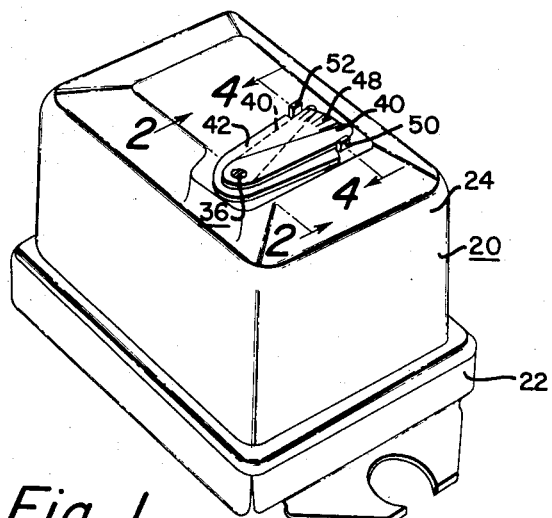
Fig. 1
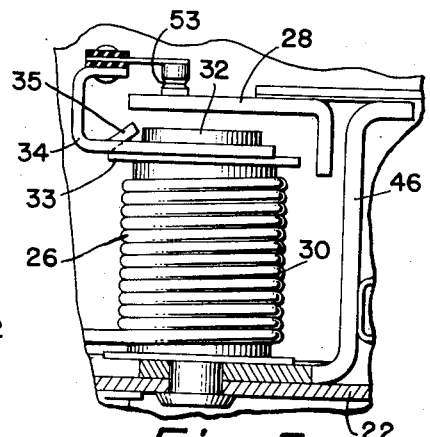
Fig. 5
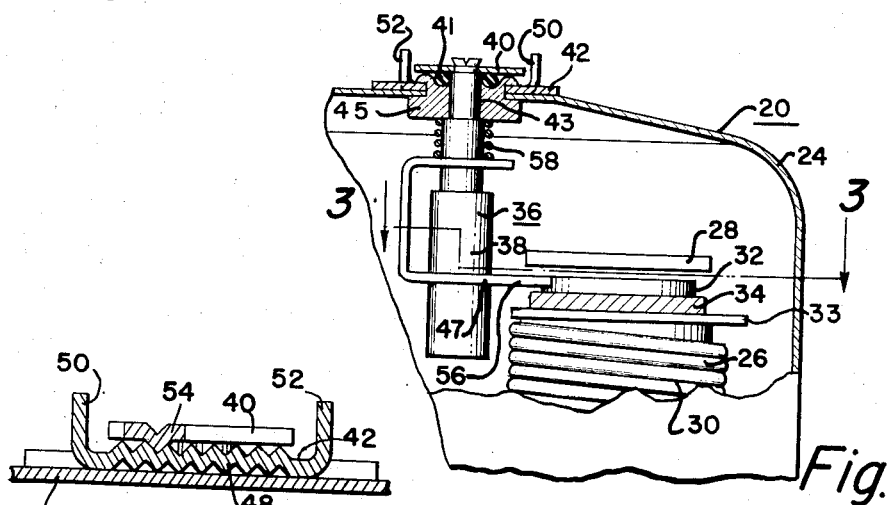
Fig. 2
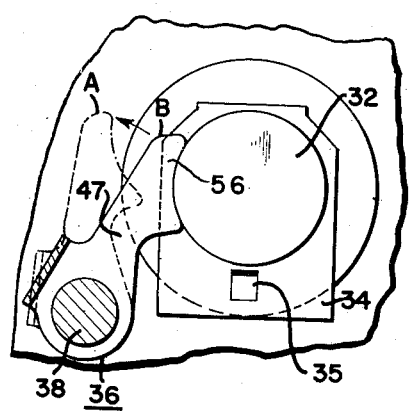
Fig. 4
Fig. 3
INVENTOR.
Thomas C. Heath
BY
His Attorney

United States Patent Office 2,869,051
Patented Jan. 13, 1959

2,869,051

ELECTRIC REGULATOR

Thomas C. Heath, Anderson, Ind., assignor to General Motors Corporation, Detroit, Mich., a corporation of Delaware Application September 22, 1954, Serial No. 457,762

2 Claims. (Cl. 317—177)

This invention relates to adjustment means and more particularly to a vernier adjustment for use in circuit controls.

Regulators are frequently used in battery charging circuits for controlling of the current and voltage output of a generator in automotive vehicles. It has been found under certain conditions a higher battery charging rate is desirable, as for instance during winter driving periods, where the combination of higher current demands during starting periods coupled with the reduced operation of the vehicle during the hazardous conditions of winter driving frequently causes the battery charge to be reduced.

This invention is directed to the elimination of the above difficulties by providing an adjustment for the voltage and current regulator that is readily accessible from the exterior of the regulator and which varies the output over a small range without disturbing any of the preadjusted internal components of the regulator.

It is further well known that when regulators are manufactured in the factory, they are provided with a factory setting. These settings are determined for average conditions and are critical and should be modified only by a skilled person utilizing sufficient number of tools and sensitive instruments. If these adjustments are otherwise made, damage may result to the battery, the regulator, or the generator.

It is an object, therefore, of the present invention to provide a regulator for controlling the output of a generator in a battery charging circuit with an adjustment means carried by the cover so that a vernier adjustment may be made on the regulator without disturbing its internal parts.

It is another object of the present invention to provide a variable magnetic shunt for the electromagnetic core of a relay in a generator regulator to vary the attraction of a movable relay armature to thereby change the setting of the regulator.

It is a further object of the present invention to provide a generator regulator relay with a variable reluctance magnetic shunt so that the attraction of a movable relay armature by a magnet core will be varied.

A more specific object of the present invention is to provide a vernier means for adjusting the effect of the attracting flux of an electromagnet on a movable relay armature of the current and voltage regulator and thus modify the controlling effect of the regulator on the field of a generator used in a battery charging circuit.

Further objects and advantages of the present invention will be apparent from the following description, reference being had to the accompanying drawing wherein a preferred embodiment of the present invention is clearly shown.

In the drawing:

Figure 1 is a perspective view of a regulator embodying the present invention.

Figure 2 is a fragmentary view partly in section of a portion of the regulator along lines 2—2 in Figure 1, showing an adjustable magnetic shunt as carried by the regulator.

Figure 3 is a fragmentary view along line 3—3 in Figure 2, showing a top view of a portion of the magnetic shunt according to the present invention.

Figure 4 is a view along line 4—4 in Figure 1, particularly showing an external adjustment lever and the locking means therefor.

Figure 5 is a side view of the relay illustrated in Figures 2 and 3.

In the drawings, and in Figure 1 particularly, a voltage and/or current regulator 20 has a base 22 that is adapted to be secured to a support, not shown, and a cover 24 which is separable from and in electrical contact with base 22. The base 22 serves as a support for voltage and/or current regulator relays of the regulator 20 which may be of the type described and set forth in application Ser. No. 425,085, as assigned by the inventor Lyman A. Rice, to the assignee of the present invention. The current and/or voltage regulator relays of the type contemplated in the present invention generally comprise an electromagnet assembly 26 which is adapted to attract a movable armature 28 when a current passing through the windings 30 induces a magnetic flux in core 32 of the electromagnet assembly 26. The core 32 rests on one leg of a generally L-shaped bracket 46 which is secured to base 22 as is the core 32. The bracket 46 pivotally supports the armature 28 which carries one of a pair of switch contacts 53. The other switch contact is supported by a part 34. This relay structure is well known to those skilled in the art and, as has been noted above, is preferably constructed as shown in copending application Serial No. 425,085, filed April 23, 1954.

The electromagnet assembly 26 is provided with an insulated separator 33 and a nonmagnetic, preferably brass, part 34 which provides a stop 35, seen in Figure 3, to limit the travel of the armature 28 toward the core 32 as set forth in the referred to application.

Electric current when passing through winding 30, which surrounds a metallic core 32, will cause a magnetic field to be induced in the core 32. This magnetic field will surround the core 32 and will attract metallic parts in the vicinity of core 32 such as armature 28, toward the core 32. The armature 28 is normally held by a spring, not shown, so that it is spaced from the magnetic core 32. When the magnetic field induced in core 32 is of sufficient strength, it will overcome the force exerted by the spring on the armature 28 and cause the armature 28 to be moved toward the core 32. The present invention permits the strength of the magnetic field to be varied in a predetermined manner so that a vernier adjustment of the attraction of the armature is accomplished. The vernier adjustment realized results in a variation in generator output of .2 or .5 volt in a 7½ volt system.

The variation in the strength of the magnetic field as produced by the electromagnet assembly 26, is accomplished by a magnetic shunt means 36 that is supported by the cover 24 so as to be out of contact with the remaining components of the regulator 20 whereby a variation in the control of the regulator 20 may be accomplished without disturbing the other internal parts of the regulator 20.

The magnetic shunt means 36 comprises a shaft 38, an adjusting lever arm 40 which rotates shaft 38, an indicator part 42 and an arm 47 which is pivoted when shaft 38 is rotated. The shaft 38 extends through an aperture 43 in cover 24 and is electrically connected with the cover through bushing 45 which has one end peened over to hold an indicating part 42 and the flanged portion which is formed on the other end of bushing 45 tightly against the interior surface of the cover 24. The portion of shaft 38 exterior to the cover 24 has a divided end which is deformed to secure lever 40 to shaft 38 and position the lever 40 relative to the indicating part 42. A sealing ring 41 for sealing against moisture as shown in Figure 2 permits the lever 40 to be moved relative to indicating part 42 without hindrance. The indicating part 42 is provided with a serrated surface 48 located between stops 50 and 52 which serve as a calibration indicator and accommodates a projection 54 on lever 40 to normally maintain the lever 40 in fixed and substantially locked position against movement relative to part 42.

Disposed on the interior portions of the regulator is an arm 47 which is nonrotatably carried relative to shaft 38 and resiliently held in electrical contact with bushing 45 by a spring 58. The arm 47 has an extending portion 56 which may be moved from a spaced distance relative to core 32 into close proximity therewith when the arm 47 is moved from position A to B as shown in Figure 3. When the extending portion 56 is in position A, substantially all the magnetic flux generated by core 32 will attract armature 28. When, however lever 40 is moved so that the extending portion 56 is moved to occupy the position B, a portion of the magnetic flux induced in core 32 will pass into the extending arm portion and be transmitted through cover and base 22 to the opposite end of core 32 without attracting the armature 28. This flux when directed away from the armature 28 will reduce the amount of attracting flux on armature 28 so that a higher current through winding 30 will be necessary before the armature will be attracted. Hence the regulator will have an adjustment for a higher or lower current or voltage setting, depending on the position of the lever 4 when it is moved between the stops 50 and 52 to provide a very sensitive vernier adjustment for the regulator.

While the embodiments of the present invention as herein disclosed, constitute preferred forms, it is to be understood that other forms might be adopted.

What is claimed in as follows:

1. In a regulator for controlling the output of a generator in a battery charging circuit, comprising; in combination, a base, a cover for said base providing an enclosed chamber, an electromagnetic assembly secured to said base and disposed within said chamber, said assembly including; a cylindrical core, a winding adapted to induce a magnetic flux in said core, an armature normally spaced from said core and adapted to be attracted by the flux induced therein by said windings, a variable reluctance magnetic shunt assembly sealingly carried by and pivotally mounted on said cover and having a portion spaced relative to said electromagnetic assembly for providing a magnetic shunt path including the cover and base for varying the effective attracting flux of said core on said armature, said portion of said shunt assembly including a metal part disposed within said chamber and having a curved end arranged to partially encircle said cylindrical core, said metal part being pivotally supported for swinging movement in a plane normal to the longitudinal axis of said core and being movable with a lever that forms another portion of said shunt assembly positioned exteriorly of said regulator cover for providing a vernier adjustment for said regulator when the position of said first mentioned portion relative to the side of said cylindrical core and windings is varied, and an indicator member on said cover having a pair of upstanding stop lugs joined by a serrated portion, a portion of said lever extending between said stop lugs and having a projection cooperating with said serrated portion for holding said lever in adjusted position.

2. In a regulator for controlling the output of a generator in a battery charging circuit, comprising in combination; a base, a cover for said base providing an enclosed chamber, an electromagnetic assembly secured to said base and disposed within said chamber, said assembly including; a cylindrical core, a winding adapted to induce a magnetic flux in said core, an armature normally spaced from said core and adapted to be attracted by the flux induced therein by said winding, and a variable reluctance magnetic shunt assembly sealingly carried by and pivotally mounted on said cover and having a portion spaced relative to said electromagnetic assembly for providing a magnetic shunt path including the cover and base for varying the effective attracting flux of said core on said armature, said portion of said shunt assembly including a metal part disposed within said chamber and having a curved end arranged to partially encircle said cylindrical core, said metal part being pivotally supported for swinging movement in a plane normal to the longitudinal axis of said core and being movable with a lever that forms another portion of said shunt assembly and which is positioned exterior to said regulator cover and in contact therewith for providing a vernier adjustment for said regulator when the position of said metal part relative to the side edge of said cylindrical core and windings is varied.

References Cited in the file of this patent

UNITED STATES PATENTS

| | | |
|---|---|---|
| 1,508,088 | Ferranti et al. | Sept. 9, 1924 |
| 2,282,933 | Cahill | May 12, 1942 |
| 2,460,921 | Candy | Feb. 8, 1949 |

FOREIGN PATENTS

| | | |
|---|---|---|
| 585,629 | France | Mar. 4, 1925 |